(12) United States Patent
Lourdeaux (10) Patent No.: US 10,387,394 B2
(45) Date of Patent: Aug. 20, 2019

(54) DATA MANAGEMENT AND DISTRIBUTION

(71) Applicant: Michael Joseph Lourdeaux, Los Altos, CA (US)

(72) Inventor: Michael Joseph Lourdeaux, Los Altos, CA (US)

(73) Assignee: 1776 Media Network, Inc., Los Altos, CA (US)

( * ) Notice: Subject to any disclaimer, the term of this patent is extended or adjusted under 35 U.S.C. 154(b) by 0 days.

(21) Appl. No.: 15/786,342

(22) Filed: Oct. 17, 2017

(65) Prior Publication Data

US 2018/0218014 A1  Aug. 2, 2018

Related U.S. Application Data (63) Continuation of application No. 15/076,639, filed on Mar. 21, 2016, now Pat. No. 9,824,103, which is a continuation of application No. 14/300,213, filed on Jun. 9, 2014, now Pat. No. 9,292,503, which is a continuation of application No. 13/470,070, filed on May 11, 2012, now Pat. No. 8,751,539, which is a continuation of application No. 12/715,344, filed on Mar. 1, 2010, now Pat. No. 8,180,798, which is a
(Continued)

(51) Int. Cl.
| | | |
|---|---|---|
| *G06F 17/30* | (2006.01) | |
| *G06F 16/22* | (2019.01) | |
| *G06F 16/00* | (2019.01) | |
| *G06F 16/9535* | (2019.01) | |
| *H04L 29/08* | (2006.01) | |

(52) U.S. Cl.
CPC .............. *G06F 16/22* (2019.01); *G06F 16/00* (2019.01); *G06F 16/9535* (2019.01); *H04L 67/1097* (2013.01); *H04L 67/22* (2013.01); *Y10S 707/99948* (2013.01)

(58) Field of Classification Search
CPC ............... G06F 17/30; G06F 17/30312; G06F 17/30867; G06F 16/22; G06F 16/00; G06F 16/9535
USPC .................................................. 707/600–899
See application file for complete search history.

(56) References Cited

U.S. PATENT DOCUMENTS

| | | |
|---|---|---|
| 6,917,960 B1 | 7/2005 | Decasper et al. |
| 7,698,301 B2 | 4/2010 | Lourdeaux |
| | (Continued) | |

OTHER PUBLICATIONS

Lourdeaux, Michael Joseph, U.S. Appl. No. 60/684,730, filed May 25, 2005 and entitled, "Data Management and Distribution."
(Continued)

*Primary Examiner* — Isaac M Woo
(74) *Attorney, Agent, or Firm* — Kokka & Backus, PC (57) ABSTRACT

Techniques associated with data management and distribution are described, including receiving at a content distribution and management system activity data associated with a user from a client, the client having an interface configured to display commercial content and a player configured to access the content distribution and management system, storing the activity data in a database, displaying the commercial content using the interface, receiving other activity data associated with the user from the client, storing the other activity data in the database, determining other commercial content to display using the activity data and the other activity data, and displaying the other commercial content.

17 Claims, 8 Drawing Sheets

Related U.S. Application Data continuation of application No. 11/439,864, filed on May 24, 2006, now Pat. No. 7,698,301.

(60) Provisional application No. 60/684,730, filed on May 25, 2005.

(56) References Cited

U.S. PATENT DOCUMENTS

| | | | |
|---|---|---|---|
| 8,180,798 B2 | 5/2012 | Lourdeaux | |
| 8,250,599 B2 | 8/2012 | Zito et al. | |
| 8,751,539 B2 | 6/2014 | Lourdeaux | |
| 9,292,503 B2 | 3/2016 | Lourdeaux | |
| 9,824,103 B2 | 11/2017 | Lourdeaux | |
| 2005/0119936 A1* | 6/2005 | Buchanan | G06F 17/30035 705/14.55 |
| 2006/0242259 A1 | 10/2006 | Vallabh et al. | |
| 2006/0278064 A1 | 12/2006 | Lourdeaux | |
| 2011/0060764 A1 | 3/2011 | Lourdeaux | |
| 2012/0291066 A1 | 11/2012 | Lourdeaux | |
| 2015/0127684 A1 | 5/2015 | Lourdeaux | |
| 2017/0046368 A1 | 2/2017 | Lourdeaux | |

OTHER PUBLICATIONS

Woo, Isaac M., Final Office Action dated Aug. 8, 2011 for U.S. Appl. No. 12/715,344.

Woo, Isaac M., Non-Final Office Action dated Apr. 2, 2008 for U.S. Appl. No. 11/439,864.

Woo, Isaac M., Non-Final Office Action dated Feb. 23, 2015 for U.S. Appl. No. 14/300,213.

Woo, Isaac M., Non-Final Office Action dated Jan. 10, 2011 for U.S. Appl. No. 12/715,344.

Woo, Isaac M., Non-Final Office Action dated Jan. 18, 2017 for U.S. Appl. No. 15/076,639.

Woo, Isaac M., Non-Final Office Action dated Jul. 5, 2013 for U.S. Appl. No. 13/470,070.

* cited by examiner

DATA MANAGEMENT AND DISTRIBUTION

CROSS REFERENCE TO RELATED APPLICATIONS

This application is a continuation of copending U.S. Non-Provisional patent application Ser. No. 15/076,639, filed Mar. 21, 2016, which is a continuation of U.S. Non-Provisional patent application Ser. No. 14/300,213, filed Jun. 9, 2014, now U.S. Pat. No. 9,292,503, which is a continuation of U.S. Non-Provisional patent application Ser. No. 13/470,070, filed May 11, 2012, now U.S. Pat. No. 8,751,539, which is a continuation of U.S. Non-Provisional patent application Ser. No. 12/715,344, filed on Mar. 1, 2010, now U.S. Pat. No. 8,180,798, which is a continuation of U.S. Non-Provisional patent application Ser. No. 11/439,864, filed May 24, 2006, now U.S. Pat. No. 7,698,301, which claims the benefit of U.S. Provisional Patent Application No. 60/684,730, filed May 25, 2005, all of which are hereby incorporated by reference in their entirety for all purposes.

FIELD OF THE INVENTION

The present invention relates generally to software. More specifically, data management and distribution are described.

BACKGROUND OF THE INVENTION

Data management and sharing capabilities of conventional implementations suffer from various disadvantages including lack of context, refresh and delivery of new content, limited selectivity, and restricted user actions and options. For example, when sharing music files over the Internet, users are often presented with a large variety of potential files for download. However, only very popular and well-marketed artists, musicians, and labels are readily available or easily found by users. Lesser-known or independent musicians, artists, bands, and other groups are often prevented from gaining wider exposure due to the large number of content providers.

Some conventional solutions attempt to present users with content oriented around particular themes. However, these solutions still result in obfuscation due to large amounts of content organized around a limited number of themes or categories. Also problematic are user models for finding, retrieving, and running audio, video, audiovisual, text, graphic/pictorial, or other files on conventional implementations.

Subscription models, pay-for-play, individual download, and other user models limit the exposure of wide ranges of content to a large user base. For example, subscription-based services may provide a user with unlimited selectivity, but limited categories and poor presentation of content limits user exposure to content. Pay-for-play models are also limiting in that the user selects, retrieves, and executes a single file for each fee (i.e., paying a per-file or per-download fee). Individual downloads are further limiting in that single files limit the amount and exposure of a user to a potentially wide range of content, particularly in music where large numbers of small and independent musicians are producing content. In these models, users are limited to the amount, type, categories, genres, and other characteristics of services that present content for download, streaming, sharing, or playing. Customizability of these services is typically generalized and does not cater to allowing independent artists, musicians, film makers, or other content providers to expose their works to users. From a content provider perspective, conventional implementations are unprofitable, limited in exposure, and difficult to manage, prohibiting data files (e.g., audio, video, audiovisual, text, graphic/pictorial, and the like) from gaining wider, if any, distribution.

Thus, what is needed is a solution for data management and distribution without the limitations of conventional implementations.

BRIEF DESCRIPTION OF THE DRAWINGS

Various examples are disclosed in the following detailed description and the accompanying drawings.

DETAILED DESCRIPTION

The invention can be implemented in numerous ways, including as a system, a process, an apparatus, or a computer readable medium such as a computer readable storage medium or a computer network wherein program instructions are sent over optical, wireless, or electronic communication links. In general, the steps of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the examples has not been described in detail to avoid unnecessarily obscuring the description.

Figure 1:
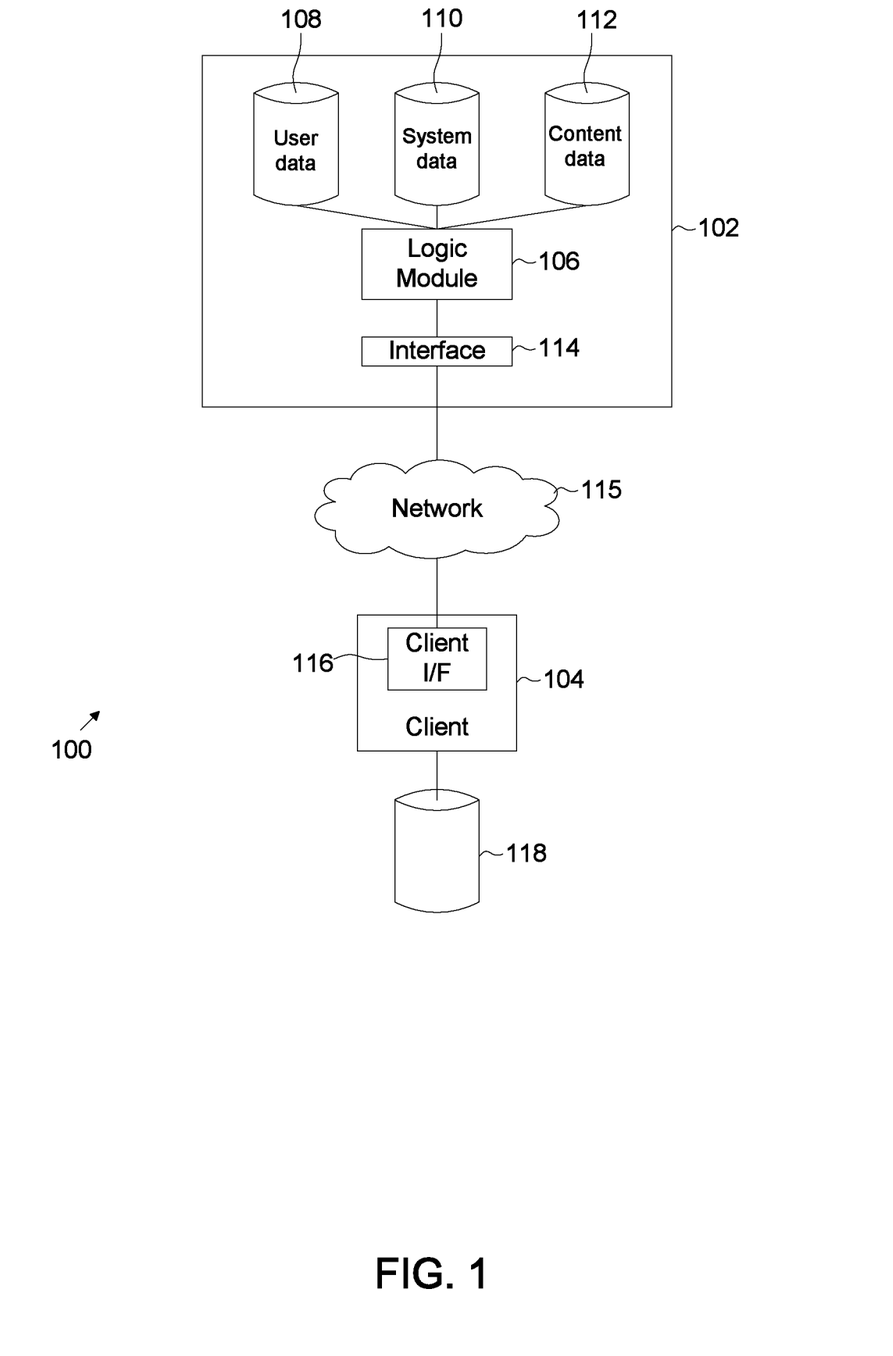
FIG. 1 illustrates an exemplary data management and distribution system.
Figure 2:
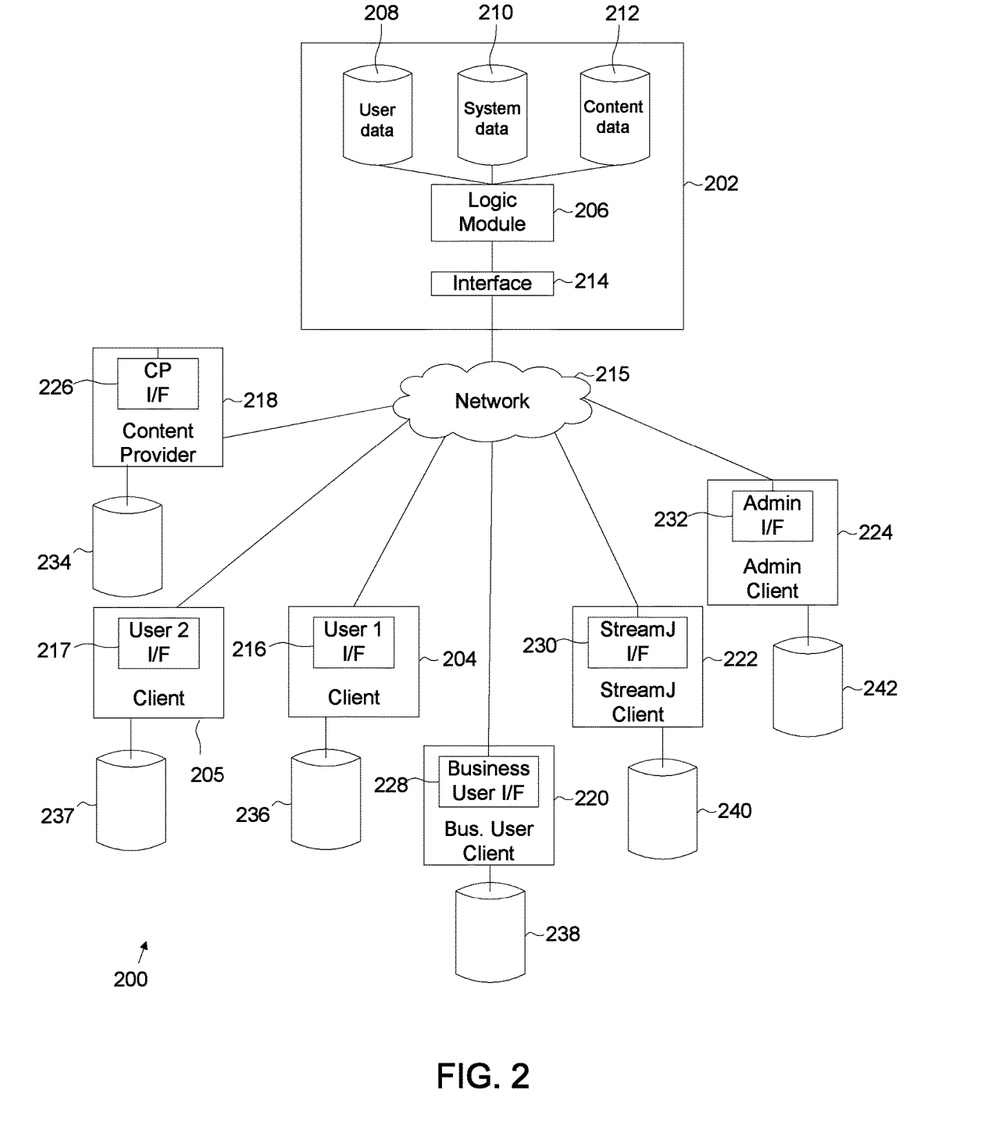
FIG. 2 illustrates an alternative exemplary data management and distribution system.

FIG. 1 illustrates an exemplary data management and distribution system. Here, system 100 includes application 102, client 104, logic module 106, user database 108, system database 110, content database 112, interface 114, network 115, client interface 116, and memory 118. In other examples, the types, number, and configuration of components may be varied. For example, application 102 and its various components may be hosted on one or multiple servers. Components within system 100 (e.g., application 102, client 104, and others) may be implemented as hardware, software, or a combination thereof. As software, components of system 100 may be implemented using a variety of structured and unstructured programming languages including Perl, Java, C, C++, C#, machine assembly, and others. In other examples, components may be varied, supplemented, or replaced (e.g., databases may be used in addition to user database 108, system database 110, and content database 112). In some examples, application 102 distributes and manages data transferred through network 115 (e.g., LAN, WAN, MAN, Internet, and the like). Client 104 includes client interface 116, which may be an application residing on a host. Client 104 and client interface 116 may be customized for various purposes, appearance, and functions. For example, client interface 116 may be a user interface customized for an individual user, administrator, business user (e.g., marketer, advertiser, business content provider, and the like), musician, artist, producer, and others ("user").

In some examples, client 104 may request and access content (e.g., an artist file, which may be a song, audio, video, audiovisual, graphical, pictorial, or other data file) from application 102. A signal, message, or other data request sent from client 104 is received by logic module 106 using interface 114. Data may be downloaded from application 102 to client 104 and stored in memory 118. For example, content files may be downloaded and run on client 104 over client interface 116. Characteristics may be used to determine the type, content, and selection of files to be downloaded to client 104. In some examples, a user profile ("profile") may include one or more characteristics. Characteristics may also be rules, criteria, or other parameters used to determine how data is transferred between application 102 and client 104. Parameters may be user-specified or system-generated. Data may be transferred between application 102 and client 104 in various formats (e.g., electronic/electrical signals, wireless signals, files, XML messages, and the like). Data transferred from client 104 to application 102 may be requests for particular types of content, specific files, or files grouped around themes, genres, or other user or system-specified characteristics. For example, client 104 may send a request in the form of an XML message to application 102. In response to the request, application 102 sends particular files (i.e., data) to client 104, based on specific parameters, characteristics, or profile data associated with a user profile stored on memory 118. Data may also be collected from client 104 by application 102 and stored in user database 108. User activity data ("activity data") may be collected in user database 108 and used to determine which content files or data are downloaded to client 104. As a further example, FIG. 2 illustrates the implementation of system 100 for implementing a music download service for different types of users.

FIG. 2 illustrates an alternative exemplary data management and distribution system. Here, system 200 includes application 202, listener user client 204-205, logic module 206, user database 208, system database 210, content database 212, interface 214, network 215, user interface 216-217, content provider client 218, business user client 220, StreamJ client 222, administrative client 224, interfaces 226-232, and memories 234-242. In some examples, system 200 may be adapted for a variety of data distribution and management purposes, including music, video, or entertainment content. For example, a wireless music player device receives music download in a Wi-Fi hot spot. A user presses a "connect" button on the music player device to connect to a music distribution and management server. Once a connection is established the user's playing information is sent to the server. After transfer is complete new songs are downloaded to the music player device according to a genre preference of the user. Here, system 200 has been adapted for the distribution and management of music content files provided by independent artists, production companies, and record labels. The above-described elements of system 200 may be implemented as hardware, software or a combination thereof. System 200 may be implemented using a client-server, peer-to-peer ("p2p"), or other type of architecture. Application 202 may also be implemented using one or more programming languages such as those described above in connection with FIG. 1. Application 202 may also be implemented on either a single or multiple machines (e.g., clients, servers, and others) and transfer data over a public or private data network (e.g., WAN, LAN, MAN, Internet, and others). In some examples, application 202 may also download content files to various types and quantities of users, who may be categorized based upon characteristics, functions, or relationships with system 200.

Here, several types of clients are used for different types of users. Content provider 218 may include users who are providing content for distribution and management by application 200. For example, content provider client 218 may be used by musicians, artists, or bands to manage, upload, provide, or otherwise work with sound recordings or other digital media files (e.g., .mp3, .mpeg, .wav, .jpg, .gif, .mov, .mp4, and others) for storage in content database 212 (which may be implemented as a single, multiple databases or storage arrays) and distribution to other users (e.g., listener user clients 204 and 205, and the like). In some examples, a musician may add a song for distribution or cancel distribution for a song. Canceling distribution prevents a song from being sent to users, but does not remove the song from system 200 if the song was previously distributed. Business user client 220 may include marketers, record labels or producers, press agents, publishers, other media creators (i.e., authors) or distributors, or other users who provide information to system 200 on how to manage, market, promote, sell, or use content commercially. StreamJ refers to an online "disc jockey" or individuals, systems, sites, or other entities who design, develop, and manage the delivery of content to listener user client 204. A StreamJ may design theme, genre, category, or other types of play list categories with or without user-created content such as voice, video, audio, graphical (i.e., image), or other types of content that may be distributed or managed by system 200. In some examples, play list categories may include clean (i.e., suitable for general audience), explicit (i.e., suitable for restricted audience), G (i.e., general), PG (i.e., parental guidance), R (i.e., restricted), X (i.e., adult) and the like. System administrators may use administrative client 224 to control or enter operational parameters that guide the operation of system 200. For example, administrative client 224 may be used to determine how content files from a content provider are distributed to listener user client 204. In other examples, content (e.g., an artist file, which may be a song, audio, video, audiovisual, graphical, pictorial, or other data file) may have multiple versions each identified by a designation, such as "clean," "explicit," with rating (e.g., G, PG, R, X, and others." A selected version may be distributed based on preference (e.g., clean, explicit, G, PG, R, X, and the like) of the content provider or listener client. The selection may be based on an algorithm performed by administrative client 224, or otherwise managed by system 200. The various clients described above may be supplemented, complemented, or replaced with other types of clients that serve different purposes. Also, the above-referenced clients may be implemented on various types of devices, including personal computers, personal entertainment systems (e.g., MP3 players, iPods®, and the like), and the like. In some examples, when a profile for a user is detected or transferred (by way of using an assigned subscriber ID) to application 202, these devices may be activated to download, store, and execute content files in various types of formats. The above description is not limited to the details described above and may be implemented differently.

Clients 204, 205 and 218-224 provide for customizable functionality by application 202 and individual users. "Swappable" or changeable "skins" (i.e., a graphical user interface or display) may be changed based on input characteristics used by logic module 206 or user activity stored in user database 208. Further, content files may be downloaded in categories or sets that are determined by application 202 or individual user preferences entered via user interface 216 and collected by logic module 206. In some examples, individual user preferences may include providing configuration settings on a player such as "clean," "explicit," or other ratings (e.g., G, PG, R, X, and others). Application 202 may limit distribution of artist files according to the user preferences based on an algorithm. For example, an algorithm may restrict downloading an artist file designated as explicit content, to avoid sending unwanted content (i.e., artist files) to a player with a profile designated as clean. As another example, an artist file designated for limited distribution (e.g., adult, explicit, R, X, or other adult content) may be substituted or replaced with a different version (i.e., "clean") when the content is requested or sent to player that is not configured to receive content with similar ratings. For example, when an explicit artist file is requested by or forwarded to a player with a profile or configuration setting indicating the player as "clean" (i.e., configured to receive content with a G or other similar rating that avoids discovery of adult content), a clean version of the artist file is sent instead. In other examples, commercial content (e.g., ads, commercials, marketing programs, and the like) may also be integrated with content files that are distributed and stored by application 202. System 200 provides the ability to deliver content based on system data, user activity, user and system-specified characteristics, or other parameters. Content files delivered by system 200 may also be managed by various types (e.g., clean, explicit, G, PG, R, X, and others) and categories of users (e.g., marketers, advertisers, musicians, record labels, production companies, and others). Content files may also be delivered using various techniques such as downloading a set or group of files that are organized by one or more characteristics (e.g., theme, genre, type, category, classification, price, date, user preferences, referral characteristics, and the like). Further, when downloaded to a client (e.g., listener user client 204, and others), one or more content files may also be forwarded to other listener user clients, which extends distribution and exposure of content for content providers. In some examples, additional components may be added to application 202 to provide electronic commerce capabilities to allow for royalty payments to be collected electronically for downloads. The above-described capabilities enable system 200 to provide both system and user-oriented "experiences" that allow for individual preferences to be accommodated. In other examples, various modifications or alternations may be made to the above-described implementation. Other modifications may be made obvious by the above description and implementations are not limited to the details provided above.

Figure 3:
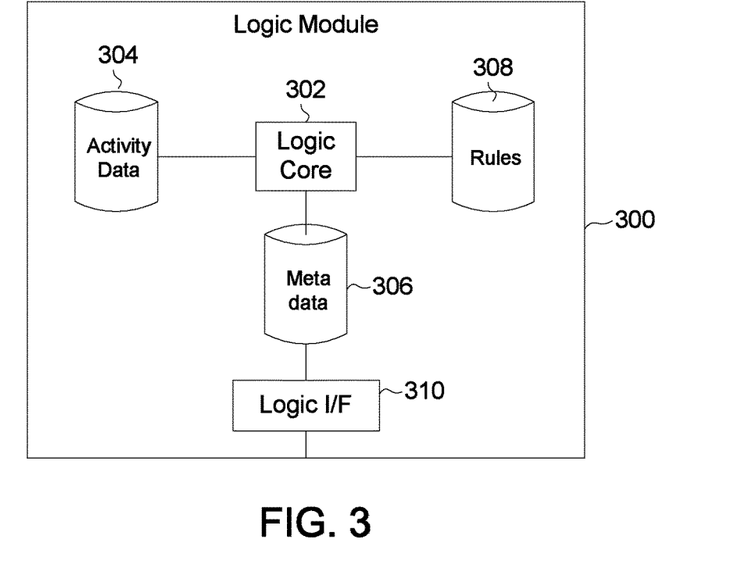
FIG. 3 illustrates an exemplary logic module configured for data management and distribution.

FIG. 3 illustrates an exemplary logic module configured for data management and distribution. Here, an example of a logic module for use in systems (e.g., 100 (FIG. 1), 200 (FIG. 2), and the like) is described. In some examples, logic module 300 includes logic core 302, activity database 304, meta database 306, rules 308, and logic interface 310. Logic core 302 may include rules, sets of instructions, or other adaptive parameters that enable systems 100 or 200 to determine the distribution and management of content files. For example, logic core 302 may be implemented as a set of rules that, when executed, determine the desired content file to be sent to a listener user client (e.g., 204 and 205 FIG. 2, and the like). In other examples, logic core 302 may include adaptive intelligence that enables user activity data stored in application 202 (FIG. 2) to evaluate a user profile, user activity and preferences, and then determine which content files to send to the client, without requiring either an active/affirmative request (i.e., push). Meta database 306 provides a repository for meta-data associated with XML messages and the like, transferred between a distribution and management application and clients. XML messages and the like may provide content and metadata, the latter of which may be used to determine the presentation or display format for particular content. In other examples, logic module 300 may be implemented in a manner different than that described above.

Figure 4:
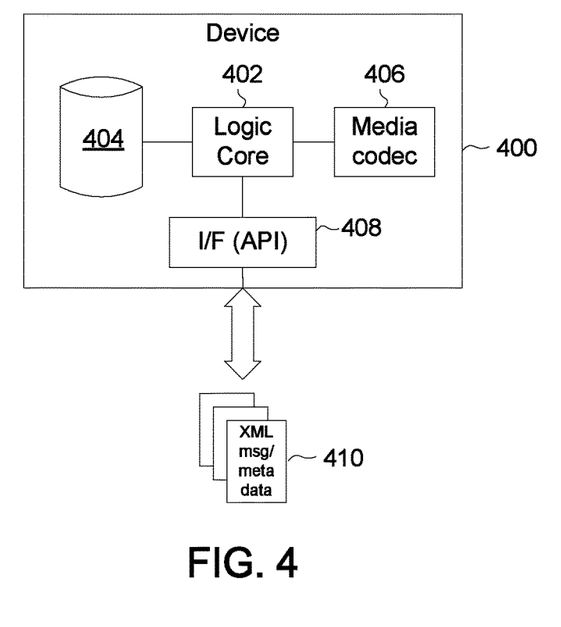
FIG. 4 illustrates an exemplary device configured for data management and distribution.

FIG. 4 illustrates an exemplary device configured for data management and distribution. Here, device 400 may be implemented as a client for purposes such as those described above in connection with FIGS. 1 and 2. In some examples, device 400 includes logic core 402, memory 404, media codec 406, and interface 408. In this example, data transferred between device 400 and a distribution and management application (e.g., 102 (FIG. 1), 202 (FIG. 2), and the like) may be XML messages and the like, which include content data and metadata. In other examples, data transfer may be performed using different techniques. Memory 404 provides local storage for content and metadata to be stored on device 400. Memory 404 may be implemented using a variety of techniques (e.g., SRAM, DRAM, Flash, and others) and is not limited to a particular implementation. Likewise, the memory and storage components described for FIGS. 1-11 may be implemented using a variety of technologies and techniques such as those described above. Referring back to FIG. 4, media code 406 enables coding and decoding of content files and may be implemented using one or a series of codecs, depending upon the type of content format used (i.e., playback) on device 400. Interface 408 enables the transfer of data between device 400 and a distribution and management application (not shown), either directly or indirectly (i.e., using a network). Other variations may be implemented with device 400 and are not limited to the details, components, or techniques described above.

Figure 5:
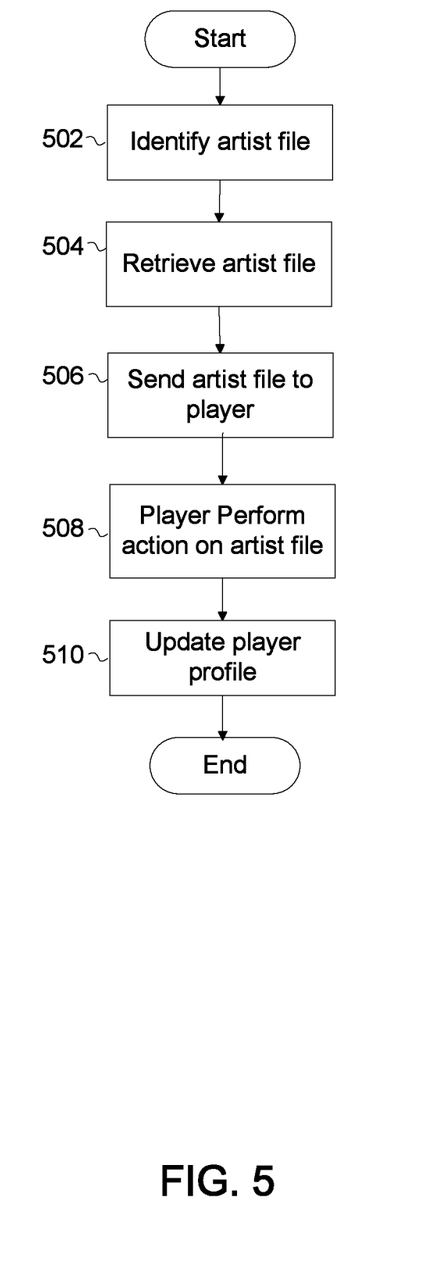
FIG. 5 illustrates a flow chart of an exemplary process for data management and distribution.

FIG. 5 illustrates a flow chart of an exemplary process for data management and distribution. This process may be adapted for a variety of data distribution and management purposes, including music, video, or entertainment content. Here, an artist file is identified for retrieval (502). In some examples, artist files (e.g., music files from musicians, ad files from advertisers, other commercial content from marketers, record labels, production companies, and the like) may be identified from local and remote content sources (e.g., content data base 212, memory 234, and others). In other examples, a music player device (e.g., clients 204 and 205 (FIG. 2), device 400 (FIG. 4), and the like) may have peer-to-peer functionality that allows identification and acquisition content from other music player devices instead of a server, which may be limited in distribution of content due to bandwidth (i.e., the connection speed and rate for passing data over a given period of time) constraints. In still other examples, artist files may be identified according to a profile using characteristic information such as demographics, psychographics, user preferences, user action history, and the like. Artist files may also be identified according to other identification schemes. Once identified, an artist file is retrieved (504). Alternatively, artist files may be retrieved in bundles ("boxcars") based on various distribution schemes. Distribution schemes for individual files or boxcars may be based on minimizing duplication, organizing files based on a given theme, genre, provider, date, user preference, referral preference or other parameter. Distribution schemes may be based on seeding a peer group, where different boxcars are sent to one or more members of a peer group to promote forwarding activity among group members. Distribution schemes may also be implemented differently.

Once retrieved, an artist file may be sent to a music player device (e.g., 104 (FIG. 1), and the like) according to one or more parameters determined by a provider of the artist file (506). In some examples, an artist file may be sent with a time expiration parameter (i.e., after a pre-set or pre-determined amount of time has expired, an artist file is no longer available, playable, downloadable, or the like). In other examples, an artist file may be sent with one or more control parameters to restrict or modify certain actions to be performed while using the music player device. For example, a control parameter may be associated with an advertisement-type artist file, which has been configured to restrict actions that can be performed using the player. For example, a control parameter may be associated with artist files designated as explicit by a provider. This control parameter may restrict actions that can be performed using a player designated as clean in user preference. For example, a control parameter may indicate the status of whether a music player device or user has paid for an artist file. A control parameter may also indicate whether a music player or user has a subscription account that is current (i.e., paid to date), should pay before an artist file is sent, or the like. If a control parameter indicates that a user is not permitted to access a given artist file, then the music player device is unable (i.e., not permitted) to download the artist file. A control parameter may also be used to allow a user who is a registered free listener to receive new music bundles (i.e., boxcars) and use the functionality of the music player device, without forwarding music to other users. Users who are paying listeners may be allowed to forward music to other users or subscribe to StreamJs. In some examples, a user may also be limited in his ability to forward artist files received from a StreamJ, which may prevent a user from redistributing the same artist files. In other examples, a user designated as explicit may be limited in his ability to forward artist files to other users designated as clean, thus avoiding sending unwanted content to another player. In still another example, system application (e.g., 202 (FIG. 2)) may substitute an explicit artist file forwarded from a user with an alternate version (e.g., clean, G, or the like) before the artist file is sent to other users that are configured to receive "clean" content, thus avoiding sending unwanted artist files to another player.

Here, a user may perform an action on a music player device (e.g., accept, reject, skip, forward, and others) (508).

In some examples, an action may be performed on an artist file during use (e.g., while playing a song a user can use an interface on a music player device and accept, reject, skip, or forward a song, or perform other actions). In some examples, acceptance of a song indicates a user likes a particular artist and wishes to receive more songs from the same artist. Likewise, rejecting a song indicates the user dislikes the artist and does not wish to receive more songs from the same artist. Further, skipping a song indicates the user is undecided, indifferent, or uncaring about an artist. Additional actions may be implemented such as clicking through to an artist's (i.e., provider's) web site, forwarding a song to a friend, or buying a song. For example, selecting a "play" button implemented on an interface associated with a music player device may not immediately play a song, but also initiate an advertisement (i.e., artist file) to be played before the song. As another example, a user may also use an "accept," "reject," "skip," "forward," or other button or control to indicate a rating feedback for the advertisement (i.e., artist file), which continues to play to the end without being physically rejected or skipped.

In some examples, when an accept, reject, skip, forward or other action is selected, meta-data (e.g., artist name, song title, total play time for each listening session, each complete play for a song, amount of time between interaction with the interface, shuffling and sorting behavior, advertiser name, ad title, each complete play for an ad, amount of time between interactions with the interface, or others) may be collected, associated with, or stored in an updated profile (510). The user profile may also be updated using other user information, such as demographics, psychographics, user preferences, and the like. The above-described process may be varied in design, function, and implementation and are not limited to the examples provided.

Figure 6:
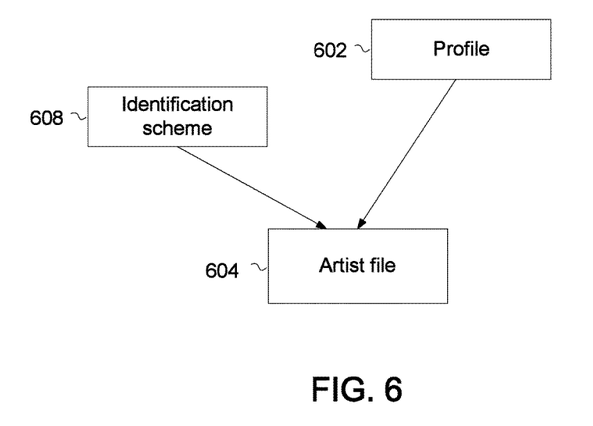
FIG. 6 illustrates a block diagram of exemplary artist file identifications for data management and distribution.

FIG. 6 illustrates a block diagram of exemplary artist file identifications for data management and distribution. Here, a profile 602 may be used to identify an artist file 604. Further, an identification scheme 608 may be used to also identify an artist file 604. In some examples, artist files may be identified according to a profile 602 associated with a music player device. The profile 602 may include user specified information such as demographics, preferred genre, artist, StreamJ, and the like. The profile 602 may also include meta-data collected from user interaction with the interface ("activity data"), such as those described above in connection with FIG. 6. In some examples, logic core 302 (FIG. 3) may include a content targeting analysis engine and an ad targeting analysis engine. In some examples, a content targeting analysis engine may be an application or logic implemented for logic core 302 (FIG. 3) and configured to analyze and target content for delivery to users or music player devices. Likewise, an ad targeting analysis engine may be an application or logic implemented for logic core 302 (FIG. 3) and configured to analyze the target commercial content (i.e., advertisements) to users or music player devices. As an example, a content targeting analysis engine may be configured to analyze information about listening preferences from profiles and music catalogs (i.e., catalogs referencing content from various data bases) to create bundles (i.e., boxcars) that are targeted to users. An ad targeting analysis engine may also be configured to analyze information about users based on information in profiles for targeted advertising. Profiles, identification schemes, and artist files may be varied in design, function, and implementation and are not limited to the examples described above.

Figure 7:
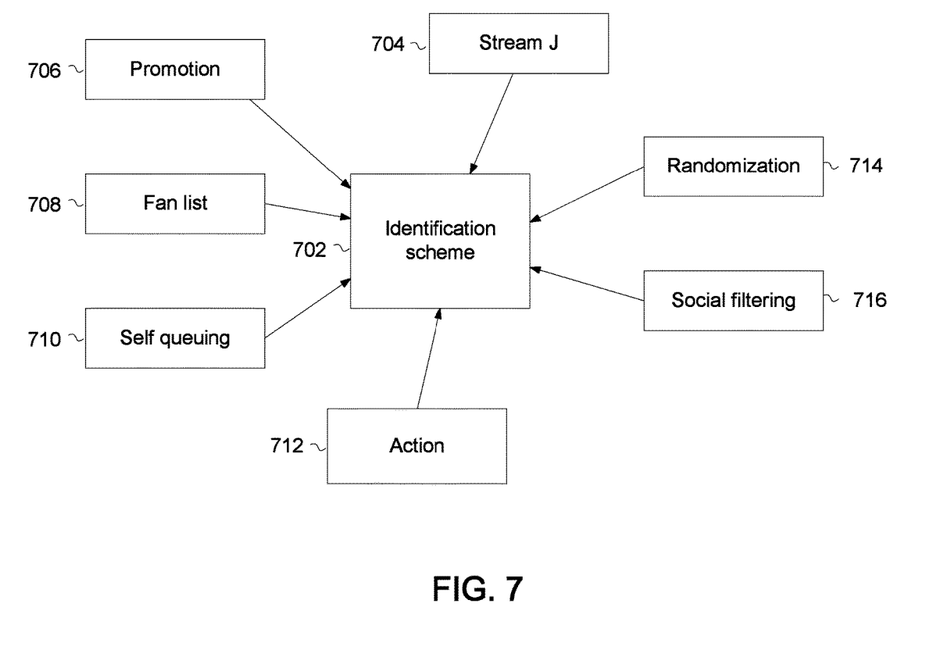
FIG. 7 illustrates a block diagram of exemplary identification schemes for data management and distribution.

FIG. 7 illustrates a block diagram of exemplary identification schemes for data management and distribution. Here, an identification scheme 702 may be based on a StreamJ 704, promotion 706, fan list 708, self-queuing 710, action 712, randomization 714, social filtering 716, or other types of schemes. Identification schemes may be used to identify particular types of artist files (e.g., music files, songs, images, advertisements, and others) for retrieval and transmission to and between music player devices. For example, a StreamJ 704 identification scheme may be used by an artist, musician, band, or other provider ("provider") to manage and distribute artist files based on subjective criteria determined by the provider. Artist files may be identified using a StreamJ, which may refer to an entity or individual responsible for determining a collection or grouping of artist files based on a theme, genre, category, play list category, or other type of parameter. In other examples, a StreamJ may also refer to the collection or grouping of artist files selected by a StreamJ. As an example, a play list may include a list of one or more artist files that may also have annotations based on a preference of a StreamJ. A user may also subscribe to a StreamJ service and receive artist files selected by a StreamJ and sent (e.g., via "streaming", or other sending method) to his music player device. In some examples, a search algorithm may match a StreamJ's play list categories to a user's preference found in a profile associated with the user's music player device. The search algorithm may report good matches for a particular listener user to a number of StreamJs.

As another example, promotion 706 may be an identification scheme used to identify advertisement files provided by advertisers, marketers, record labels or producers, press agents, publishers, and other entities providing commercial content to send to a demographically, psychographically, or otherwise targeted audience. In some examples, advertisement files may be added, inserted, combined, or otherwise annotated to other artist files for transmission to one or more music player devices. Promotion 706 may also be used as an identification scheme by musicians, artists, or bands to target an audience based on user profile and to send content to promote a particular song or album. As another example, artist files sent to a music player device may also be determined using an identification scheme based on fan list 708. Fan list refers to a list of a group of listener users following a particular artist, musician, band, or the like. In still other examples, using an identification scheme based on self queuing 710, a user may access another profile on another music player device associated with a friend and identify one or more artist files based on preferences reflected in another profile. In some examples, a user designated as "clean" may be limited in his ability to access a player designated as "explicit" or to identify an artist file designated as "explicit." In other examples, an artist file may have selected versions with different ratings (e.g., explicit, R, X or the like). Different versions of an artist file may be substituted by system application (e.g., 202 (FIG. 2)) with an alternate version (i.e., "clean," G, or the like). For example, an explicit artist file may be replaced with a "clean" version of the artist file in order to prevent sending explicit content to a player configured by a user as "clean."

In some examples, using action 712, artist files may be identified based on an action (e.g., request, or the like) specified on a music player device or an action (e.g., forward, or the like) specified on another music player device. In other examples, artist files may also be identified using an identification scheme based on randomization 714. Identification schemes based on randomization 714 retrieve and send artist files to a music player device randomly.

In still other examples, artist files may be identified according to demographics based on social filtering or social network referral techniques (716). As an example, social network referral techniques may be based on music being forwarded between music player devices shared within a community of friends or among users belonging to a 'friends list'. In an example, a community may be designated as "clean" and is limited in identifying artist files designated as "explicit." In another example, a community may be designated as "explicit" and may identify artist files designated as "clean" or "explicit" based on individual user choices or preference. In other examples, artist files may have ratings other than "clean" or "explicit." In still other examples, ratings may be used by third parties (e.g., marketers, advertisers, StreamJs, users, and others) to control whether content may be forwarded, distributed, or sent. For example, an artist file with an "explicit" rating may be prevented from forwarding to a player that is set to receive only "clean" content. As another example, a marketer or advertiser may send content (e.g., artist files having commercial content such as advertisements) to players that have characteristics or parameters (e.g., age, tolerance for explicit or adult content) set to permit adult commercial content to be received (i.e., commercial content for alcohol, prophylactic sexual aids, and the like). As another example, social network referral techniques may be based on self-queuing (as described above) within a community of friends. Social network referral techniques may expand a fan list according to the user forwarding music files received from a promotion from a band, artist, marketer, or the like. The above-described examples may be varied and are not limited to the description provided.

Figure 8:
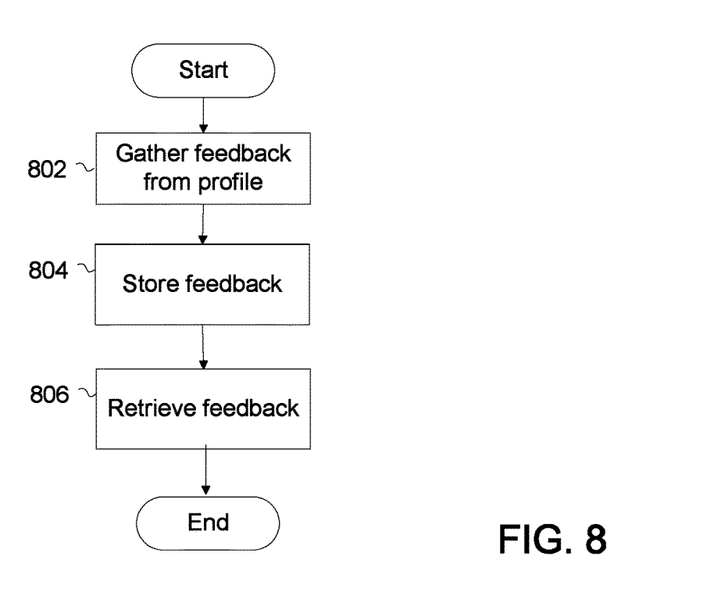
FIG. 8 illustrates a flow chart of an exemplary feedback process for data management and distribution.

FIG. 8 illustrates a flow chart of an exemplary feedback process for data management and distribution. In some examples, meta-data may represent a user's feedback (i.e., opinion, subjective analysis, comments, edits, or the like) regarding particular artist files and providers (e.g., music, musicians, artists, bands, StreamJs, marketers, record labels, producers, press agents, publishers, and the like). Feedback may be collected from profile (802). Once collected, feedback data may be stored in user data base 208 as described in connection with FIG. 2 (804). Providers may be allowed to access or retrieve the feedback through clients 218-224 (FIG. 2) (806). For example, when an artist file is played, a user may accept, reject, skip, forward, or perform another function (i.e., by pressing a button on an interface associated with a music player device), thus sending meta-data (e.g., artist name, song title, total play time for each listening session, each complete play for a song, amount of time between interaction with the interface, shuffling and sorting behavior, or the like) for collection into a profile, as described above in connection with FIG. 5. As another example, when an advertisement file (i.e., an artist file that includes commercial content provided by a marketer, advertiser, advertising agency, or the like) is played, meta-data (e.g. advertiser name, ad title, each complete play for an ad, amount of time between interactions with the interface, or the like) may be collected into a profile as described above in connection with FIG. 5. The above-described process may be varied and is not limited to the examples provided.

Figure 9:
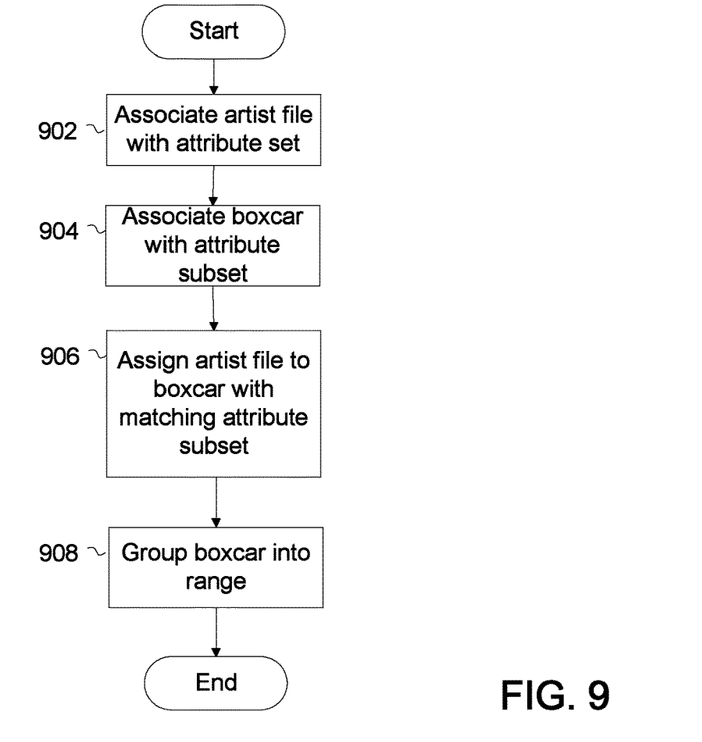
FIG. 9 illustrates a flow chart of an exemplary distribution process for data management and distribution.

FIG. 9 illustrates a flow chart of an exemplary distribution process for data management and distribution. Here, artist files are organized by or associated with an attribute set comprising one or more characteristics (e.g. theme, genre, type, category, classification, price, date, user preference, referral characteristics, and the like) (902). In some examples, artist files may be grouped together in bundles or "boxcars." Each boxcar is associated with a subset of the above-described attribute set (904). Once attribute subsets have been assigned to a boxcar, artist files having substantially the same attribute sub-set are assigned to the boxcar (906). Artist files may be determined for inclusion in a given boxcar using an algorithm to determine a heterogeneous mix of artist files included in a boxcar based on the assigned attributes. An algorithm may be implemented using a variety of techniques, characteristics, and parameters to determine how, when, and what type of content is sent to a player or group of players. For example, some players may have age or tolerance parameters that prevent "explicit" or adult content from being received. In other examples, user groups (i.e., groups of players sharing a common characteristic or parameter) may choose not to receive adult content, have settings to prevent reception or forwarding of content (i.e., artist files) based on player settings or parameters. Here, a heterogeneous mix of artist files may include songs that are arranged according to a particular order, randomly ordered, or ordered differently. Heterogeneous mix may also refer to a mix or collection of songs that are included in a non-uniform manner. For example, an algorithm may distribute artist files based on an attribute such as an artist label, distributor, aggregator, or the like. In other examples, an artist file may be identified (i.e., by a publishing company, record label, or the like) as a preferred file. In some examples, a preferred file may refer to artist files that are identified or selected for greater distribution than others. An artist file may also be identified using social filtering and popularity rankings by members (i.e., constituents, subscribers, and the like) of a network (i.e., subscriber base, listening audience, or other users that belong to a group, organization, or share some other affiliation). Boxcars may be grouped into ranges so that artist file distribution may be managed (908). In some examples, ranges may be used to determine what boxcars to distribute or remove from distribution to users. In other examples, ranges may be used to determine how boxcars are distributed to users. In still other examples, ranges may be used differently. For example, each boxcar represents a bundle of music files with matching genre. A music download service may distribute boxcars to users periodically. The music download service may distribute boxcars to a community of friends, buddy list, or peer group using a pattern or algorithm to avoid duplication. Various patterns or algorithms may be used and the above-described process is not limited to any particular implementation. Exposure of music files may be expanded by forwarding or self-queuing artist files among users of a community (e.g., friends or buddy lists, peer groups, social networks, or the like). A community may be identified to a music download service based on analysis of profiles. The above-described process may be varied and is not limited to the examples provided.

Figure 10:
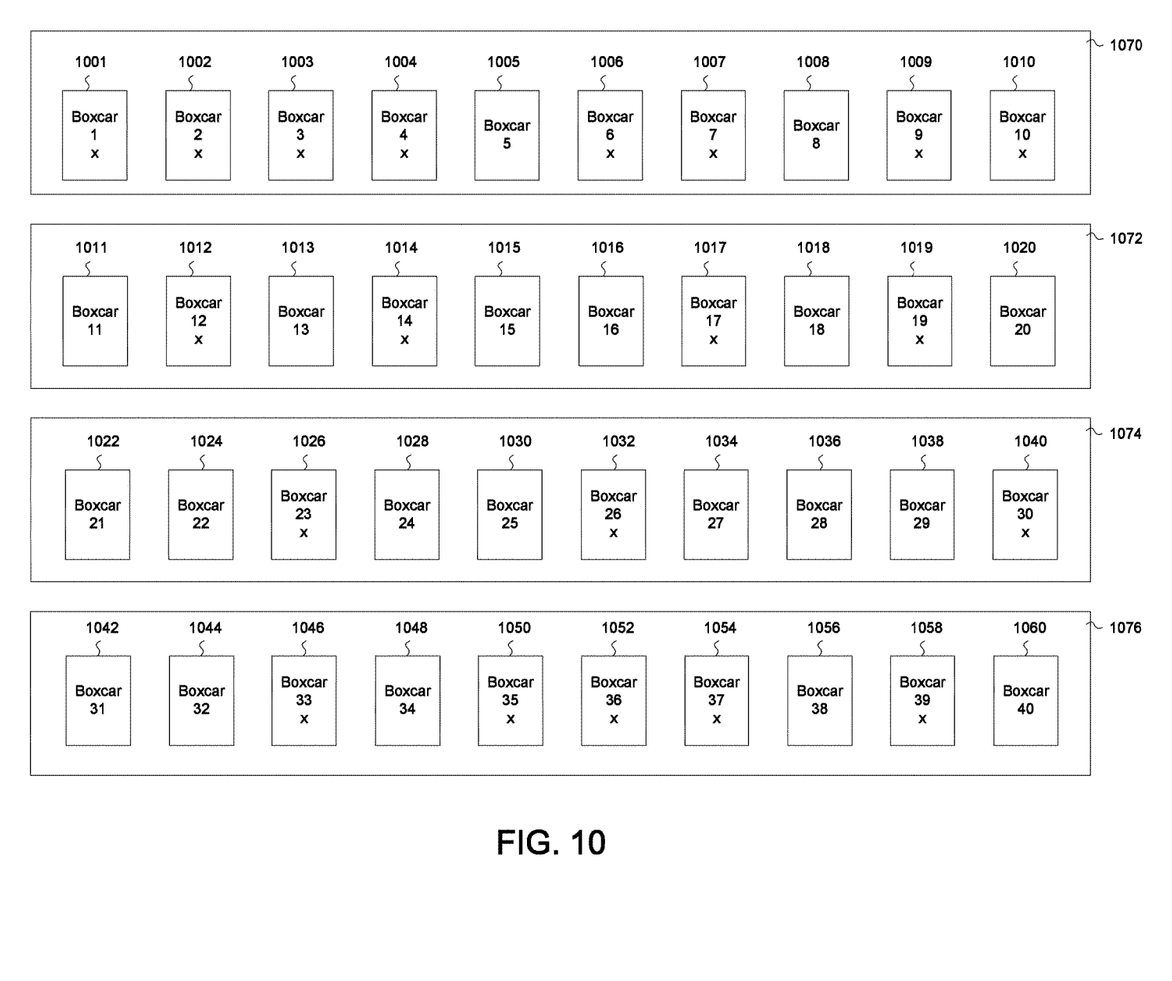
FIG. 10 illustrates a block diagram of an exemplary artist file bundling for data management and distribution.

FIG. 10 illustrates a block diagram of an exemplary artist file bundling for data management and distribution. Here, boxcars 1001-1060 are organized in ranges 1072-1076. In some examples, boxcars 1001-1060 each represent artist files bundled together based on, for example, a matching attribute or attribute subset such as genre (e.g. rock, electronic, hip hop, rap, jazz, or the like). Boxcars 1001-1010 form a range 1070. Boxcars 1011-1020 forms a range 1064 and boxcars 1022-1040 and 1042-1060 form ranges 1074 and 1076, respectively. Here, ranges 1056 and 1068 each include 10 boxcars. In other examples, ranges 1070-1076 may include fewer or more artist files and are not limited to the examples provided.

As an example, a music download service may send one boxcar to a listener user each week. For example, the block diagram in FIG. 10 may represent a snapshot at a given time. Boxcars marked with "x" (e.g., boxcars 1001-1004, 1006-1007, 1009-1010, 1012, 1014, 1017, 1019, 1026, 1032, 1040, 1046, 1050-1054, 1058) represent boxcars that have been sent to a user. Therefore, in FIG. 10 80% of range 1070, 40% of range 1072, 30% of range 1074, and 50% of range 1076 have been sent to the user. A user or system-specified threshold may be set such that when 80% of the boxcars in a given range have been sent, the given range is removed from further distribution to users (i.e., music player devices). Here, boxcar range 1070 may be removed from further distribution to a user while boxcar ranges 1072-1076 are distributed. In other examples, different thresholds may be specified and are not limited to the example provided above. In some examples, boxcars may be disassembled (i.e., eliminated) based on changes in attributes or in changes in attributes relative to other artist files. Artist files within the disassembled boxcar are then candidates for new boxcars along with other artist files in the network that are not included in boxcars or a specific boxcar group. The above-described process may be varied and is not limited to the examples provided.

Figure 11:
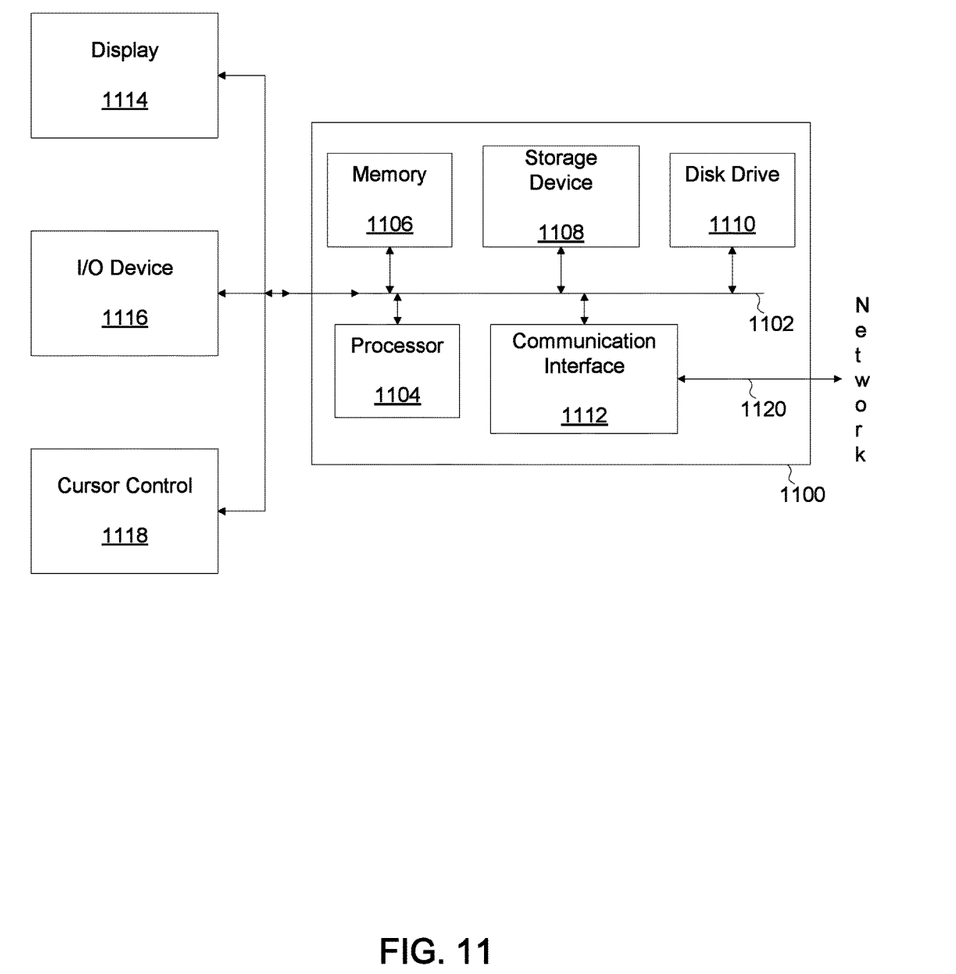
FIG. 11 is a block diagram illustrating an exemplary computer system suitable for data management and distribution.

FIG. 11 is a block diagram illustrating an exemplary computer system suitable for data management and distribution. In some examples, computer system 1100 may be used to implement computer programs, applications, methods, or other software to perform the above-described techniques such as those described above. Computer system 1100 includes a bus 1102 or other communication mechanism for communicating information, which interconnects subsystems and devices, such as processor 1104, system memory 1106 (e.g., RAM, or the like), storage device 1108 (e.g., ROM, or the like), disk drive 1110 (e.g., magnetic, optical, or the like), communication interface 1112 (e.g., modem, Ethernet card, or the like), display 1114 (e.g., CRT, LCD, or the like), input device 1116 (e.g., keyboard, or others), and cursor control 1118 (e.g., mouse, trackball, or the like).

In some examples, computer system 1100 performs specific operations by processor 1104 executing one or more sequences of one or more instructions stored in system memory 1106. Such instructions may be read into system memory 1106 from another computer readable medium, such as static storage device 1108 or disk drive 1110. In other examples, hard-wired circuitry may be used in place of or in combination with software instructions to implement the invention.

The term "computer readable medium" refers to any medium that participates in providing instructions to processor 1104 for execution. Such a medium may take many forms, including but not limited to, non-volatile media, volatile media, and transmission media. Non-volatile media includes, for example, optical or magnetic disks, such as disk drive 1110. Volatile media includes dynamic memory, such as system memory 1106. Transmission media includes coaxial cables, copper wire, and fiber optics, including wires that comprise bus 1102. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 1100. Two or more computer systems 1100 coupled by communication link 1120 (e.g., LAN, PSTN, wireless network, or the like) may perform the sequence of instructions in coordination with one another. Computer system 1100 may transmit and receive messages, data, and instructions, including program (i.e., application code) through communication link 1120 and communication interface 1112. Received program code may be executed by processor 1104 as it is received, and/or stored in disk drive 1110, or other non-volatile storage for later execution.

Although the foregoing examples have been described in some detail for purposes of clarity of understanding, implementations of the above-described system and techniques is not limited to the details provided. There are many alternative implementations and the disclosed examples are illustrative and not restrictive.

What is claimed:

1. A system, comprising:
a memory configured to store data associated with a content distribution and management system; and
a process configured to logic module configured to receive at the content distribution and management system a request from a client, to use a logic core to implement adaptive intelligence configured to parse the request to identify a boxcar including a heterogeneous mix of one or more content files, the adaptive intelligence is configured to send the one or more content files from a wireless media player device associated with the user profile to another wireless media player device associated with at least one of the one or more user profiles, the adaptive intelligence being configured to generate a determination based on evaluating user activity data to algorithmically identify, without user input, which of the one or more content files to send to the other wireless media player devices, the boxcar being responsive to the request, and to invoke the adaptive intelligence to evaluate a user profile associated with the client, user activity, a control parameter, and one or more user profiles associated with the request to identify, using an application configured to execute one or more algorithms, at least one of the one or more content files, and to use a distribution scheme or the control parameter to determine whether the at least one of the one or more content files is configured to be distributed to the client in a first version or a second version.

2. The system of claim 1, wherein the client comprises a client or a streamj client, the client or the streamj client being configured to provide the control parameter to the content distribution and management system.

3. The system of claim 1, further comprising a content targeting analysis engine configured to return, in response to the request, the at least one of the one or more content files to the client, wherein the client further comprises at least a streamj client and another client configured to render the at least one of the one or more content files in accordance with the distribution scheme and a codec instantiated on the another client.

4. The system of claim 1, wherein the distribution scheme comprises one or more parameters configured to identify the boxcar.

5. The system of claim 1, wherein the distribution scheme comprises one or more parameters configured to identify a file within the boxcar, the file being configured to be returned in response to the request.

6. The system of claim 1, wherein the client is a streamj.

7. The system of claim 1, wherein the client is an application.

8. The system of claim 1, wherein the control parameter is configured to restrict the one or more content files from being transferred to the client.

9. The system of claim 1, wherein the control parameter is configured to restrict data associated with the one or more content files from being transferred to the client in response to the request.

10. The system of claim 1, further comprising removing from the boxcar another file from the one or more content files if the another file was previously transferred to the client in response to another request received prior to the request.

11. The system of claim 1, wherein the process is further configured to detect, using the adaptive intelligence, another request identifying the at least one of the one or more content files wherein the another request is not configured to provide access to the at least one of the one or more files.

12. The system of claim 1, wherein the process is further configured to detect, using the adaptive intelligence, another request from another client, the another request being configured to identify another file of the one or more content files wherein the another request does not include data configured to permit access to the another file.

13. The system of claim 1, wherein the first version is a clean version.

14. The system of claim 1, wherein the first version is an explicit version.

15. The system of claim 1, wherein the first version or the second version is selected based on identifying an age associated with the control parameter.

16. The system of claim 1, wherein the first version or the second version is selected by the adaptive intelligence based on identifying an age limit associated with the distribution scheme.

17. The system of claim 1, wherein the distribution scheme is configured to transfer data associated with the boxcar to the client and to remove another file from the one or more content files if the client, based on the adaptive intelligence parsing the control parameter, is not permitted to access the another file.

* * * * *